US006781745B2

(12) United States Patent
Chung et al.

(10) Patent No.: US 6,781,745 B2
(45) Date of Patent: Aug. 24, 2004

(54) ELECTROPHORETIC DISPLAY WITH GATING ELECTRODES

(75) Inventors: Jerry Chung, Mountain View, CA (US); David Chen, Buena Park, CA (US)

(73) Assignee: Sipix Imaging, Inc., Milpitas, CA (US)

( * ) Notice: Subject to any disclaimer, the term of this patent is extended or adjusted under 35 U.S.C. 154(b) by 0 days.

(21) Appl. No.: 10/242,335

(22) Filed: Sep. 11, 2002

(65) Prior Publication Data

US 2003/0072072 A1 Apr. 17, 2003

Related U.S. Application Data

(60) Provisional application No. 60/322,635, filed on Sep. 12, 2001.

(51) Int. Cl.[7] .......................... G02B 26/00; G02F 1/03; G02F 1/29; G09G 3/34; H01B 3/20; G03G 17/04
(52) U.S. Cl. ........................ 359/296; 359/254; 359/316; 345/107; 345/108; 345/111; 430/35; 252/572
(58) Field of Search ................................. 359/296, 254, 359/316; 345/107, 108, 111; 430/35; 252/572

(56) References Cited

U.S. PATENT DOCUMENTS

| 3,612,758 A | 10/1971 | Evans et al. ................. 348/803 |
| 3,668,106 A | 6/1972 | Ota ............................. 358/305 |
| 3,697,679 A | 10/1972 | Hathaway .................... 360/85 |

(List continued on next page.)

FOREIGN PATENT DOCUMENTS

| EP | 1 089 118 A2 | 4/2001 | ........... G02F/1/167 |
| JP | 59-171930 | 9/1984 | ............. G02F/1/19 |
| JP | 2001-201770 | 7/2001 | ........... G02F/1/167 |
| WO | WO 99/53373 | 10/1999 | ........... G02F/1/167 |
| WO | WO 99/56171 | 11/1999 | ........... G02F/1/167 |
| WO | WO 00/60410 | 10/2000 | ........... G02F/1/167 |
| WO | WO 01/67170 | 9/2001 | ........... G02F/1/167 |

OTHER PUBLICATIONS

USSN 09/518,488, filed Mar. 3, 2000 (to be provided upon request).
USSN 09/606,654, filed Jun. 28, 2000 (to be provided upon request).
Cominsky, B. et al., "An Electrophoretic Ink For All–Printed Reflective Electronic Displays", Letters to Nature, pp. 253–255 (1998).
Dalisa, A.L., "Electrophoretic Display Technology", IEEE Transactions of Electron Devices, Jul. 1997, pp. 827–834.
Drzaic, P., "Liquid Crystal Dispersion", The PDLC Paradigm, (1995), pp. 1–9.
Harvey, T.G. "Replication Techniques For Micro–Optics", SPIE, vol. 3099, pp. 76–82 (1997).
Hopper, M.A. and Novotny, V., "An Electrophoretic Display, It's Properties, Model, and Addressing" IEEE Transactions on Electron Devices, vol. ED–26, No. 8, Aug. 1979, pp. 1148–1152.
Harbour, J.R. et al., "Subdivided Electrophoretic Display", Xerox Disclosure Journal, vol. 4, No. 6 (1979).
Lewis, J.C., et al., "Gravitational, Inter–Particle–Electrode Forces in Electrophoretic Display", Proceedings of the S.I.D., vol. 18/3&4 (1977).
Murau, P., et al., "The Understanding and Elimination of Some Suspension Instabilities in an Electrophoretic Display", J. Appl. Phys., 49(9), (1978).

(List continued on next page.)

Primary Examiner—Georgia Epps
Assistant Examiner—Jack Dinh
(74) Attorney, Agent, or Firm—Van Pelt & Vi LLP

(57) ABSTRACT

An electrophoretic display comprising at least one in-plane gating electrode. The gating electrode(s) provide a gating effect, which raises the effective threshold voltage to prevent the undesired movement of the charged particles in the cells. The design of the invention can be manufactured using low cost materials by efficient processes.

24 Claims, 5 Drawing Sheets

U.S. PATENT DOCUMENTS

| | | |
|---|---|---|
| 4,071,430 A | 1/1978 | Liebert ................... 359/241 |
| 4,093,534 A | 6/1978 | Carter et al. ............. 359/296 |
| 4,285,801 A | 8/1981 | Chiang ................... 252/570 |
| 4,655,897 A | 4/1987 | DiSanto et al. ........... 359/296 |
| 4,680,103 A | 7/1987 | Beilin Solomon, I et al. ..................... 359/296 |
| 4,686,524 A | 8/1987 | White ..................... 345/107 |
| 4,741,988 A | 5/1988 | Van der Zande et al. ... 430/312 |
| 4,995,718 A | 2/1991 | Jachimowicz et al. ...... 353/31 |
| 5,177,476 A | 1/1993 | DiSanto et al. ........... 345/107 |
| 5,276,438 A | 1/1994 | DiSanto et al. ........... 345/107 |
| 5,279,511 A | 1/1994 | DiSanto et al. ........... 445/241 |
| 5,345,251 A | 9/1994 | DiSanto et al. ........... 345/107 |
| 5,380,362 A | 1/1995 | Schubert ................. 106/473 |
| 5,403,518 A | 4/1995 | Schubert ................. 252/572 |
| 5,573,711 A | 11/1996 | Hou et al. ............... 252/572 |
| 5,589,100 A | 12/1996 | Grasso et al. ......... 252/299.01 |
| 5,699,097 A | 12/1997 | Takayama et al. ......... 347/171 |
| 5,835,174 A | 11/1998 | Clikeman et al. ........... 349/86 |
| 5,914,806 A | 6/1999 | Gordon, II et al. ....... 359/296 |
| 5,930,026 A | 7/1999 | Jacobson et al. ........ 359/296 |
| 5,961,804 A | 10/1999 | Jacobson et al. ........ 204/606 |
| 5,976,405 A | 11/1999 | Clikeman et al. ...... 252/299.01 |
| 6,017,584 A | 1/2000 | Albert et al. ........... 280/743.1 |
| 6,037,058 A | 3/2000 | Clikeman et al. ........ 428/402.2 |
| 6,067,185 A | 5/2000 | Albert et al. ............. 359/296 |
| 6,111,598 A | 8/2000 | Faris ....................... 348/57 |
| 6,113,810 A | 9/2000 | Hou et al. ................ 252/572 |
| 6,120,588 A | 9/2000 | Jacobson ................ 106/31.16 |
| 6,120,839 A | 9/2000 | Comiskey ................ 427/213.3 |
| 6,172,798 B1 | 1/2001 | Albert et al. ............. 359/296 |
| 6,184,856 B1 | 2/2001 | Gordon, II et al. ......... 345/107 |
| 6,252,624 B1 | 6/2001 | Yuasa et al. ............... 348/56 |
| 6,312,304 B1 | 11/2001 | Duthaler et al. ............ 445/24 |
| 6,327,072 B1 | 12/2001 | Comiskey et al. ......... 359/296 |
| 6,337,761 B1 | 1/2002 | Rogers et al. ............. 359/296 |
| 6,392,786 B1 | 5/2002 | Albert ..................... 359/296 |
| 2002/0126249 A1 | 9/2002 | Liang et al. ............... 349/187 |
| 2002/0182544 A1 | 12/2002 | Chan-Park et al. ......... 430/311 |

OTHER PUBLICATIONS

Nakamura, E., et al., "Development of Electrophoretic Display Using Microcapsulated Suspension", SID Digest, (1998), pp. 1014–1017.

Ota, I., et al., "Electrophoretic Image Display EPID Panel", Proceedings of the IEEE, vol. 1, No. 7, Jul. 1973.

Singer, B. and Dalisa, A.L., "An X–Y Addressable Electrophoretic Display", Proceeding of the S.I.D., vol. 18/3&4, (1977).

Slafer, D.W., et al., "Continuous Manufacturing of Thin Cover Sheet Optical Media", SPIE, vol. 1663, (1992), pp. 323–335.

ELECTROPHORETIC DISPLAY WITH GATING ELECTRODES

This application claims benefit of appln. 60/322,635 filed Sep. 12, 2001.

BACKGROUND OF THE INVENTION

The electrophoretic display (EPD) is a non-emissive device based on the electrophoresis phenomenon of charged pigment particles suspended in a solvent. It was first proposed in 1969. The display usually comprises two plates with electrodes placed opposing each other, separated by using spacers. One of the electrodes is usually transparent. A suspension composed of a colored solvent and charged pigment particles is enclosed between the two plates. When a voltage difference is imposed between the two electrodes, the pigment particles migrate to one side and then either the color of the pigment or the color of the solvent can be seen according to the polarity of the voltage difference.

There are several different types of EPDs. In the partition type EPD (see M. A. Hopper and V. Novotny, *IEEE Trans. Electr. Dev.*, 26(8):1148–1152 (1979)), there are partitions between the two electrodes for dividing the space into smaller cells in order to prevent undesired movements of particles such as sedimentation. The microcapsule type EPD (as described in U.S. Pat. Nos. 5,961,804 and 5,930,026) has a substantially two dimensional arrangement of microcapsules each having therein an electrophoretic composition of a dielectric fluid and a suspension of charged pigment particles that visually contrast with the dielectric solvent. Another type of EPD (see U.S. Pat. No. 3,612,758) has electrophoretic cells that are formed from parallel line reservoirs. The channel-like electrophoretic cells are covered with, and in electrical contact with, transparent conductors. A layer of transparent glass from which side the panel is viewed overlies the transparent conductors.

An improved EPD technology was disclosed in co-pending applications, U.S, Ser. No. 09/518,488, filed on Mar. 3, 2000 (corresponding to WO01/67170), U.S. Ser. No. 09/759,212, filed on Jan. 11, 2001, U.S. Ser. No. 09/606,654, filed on Jun. 28, 2000 (corresponding to WO02/01280) and U.S. Ser. No. 09/784,972, filed on Feb. 15, 2001, all of which are incorporated herein by reference. The improved EPD comprises closed cells formed from microcups of well-defined shape, size and aspect ratio and filled with charged pigment particles dispersed in a dielectric solvent.

All of these EPDs may be driven by a passive matrix system. For a typical passive matrix system, there are row electrodes on the top side and column electrodes on the bottom side of the cells. The top row electrodes and the bottom column electrodes are perpendicular to each other. However, there are two well-known problems associated with EPDs driven by a passive matrix system: cross talk and cross bias. Cross talk occurs when the particles in a cell are biased by the electric field of a neighboring cell. FIG. 1 provides an example. The bias voltage of the cell A drives the positively charged particles towards the bottom of the cell. Since cell B has no voltage bias, the positively charged particles in cell B are expected to remain at the top of the cell. However, if the two cells, A and B, are close to each other, the top electrode voltage of cell B (30V) and the bottom electrode voltage of cell A (0V) create a cross talk electric field which forces some of the particles in cell B to move downwards. Widening the distance between adjacent cells may eliminate such a problem; but the distance may also reduce the resolution of the display.

The cross talk problem may be lessened if a cell has a significantly high threshold voltage. The threshold voltage, in the context of the present invention, is defined to be the maximum bias voltage that may be applied to a cell without causing movement of particles between two electrodes on opposite sides of the cell. If the cells have a sufficiently high threshold voltage, the cross-talk effect is reduced without sacrificing the resolution of the display.

Unfortunately, the cells in EPDs made using the typical electrophoretic materials and techniques currently available typically do not have a sufficiently high driving threshold voltage to prevent the undesired movement of particles. As a result, the EPDs constructed from these materials usually cannot achieve high resolution.

Cross bias is also a well-known problem for a passive matrix display. The voltage applied to a column electrode not only provides the driving bias for the cell on the scanning row, but it also affects the bias across the non-scanning cells on the same column. This undesired bias may force the particles of a non-scanning cell to migrate to the opposite electrode. This undesired particle migration causes visible optical density change and reduces the contrast ratio of the display.

A system having gating electrodes was disclosed in U.S. Pat. Nos. 4,655,897 and 5,177,476 (assigned to Copytele, Inc.) to provide EPDs capable of high resolution at relative high driving voltage using a two layer electrode structure, one of which layers serves as a gating electrode. Although these references teach how the threshold voltage may be raised by the use of gating electrodes, the cost for fabricating the two electrode layers is extremely high due to the complexity of the structure and the low yield rate. In addition, in this type of EPD, the electrodes are exposed to the solvent, which could result in an undesired electroplating effect.

Therefore, there is a need for a way to effectively raise the cell threshold voltage to avoid display performance degradation when a cross bias and/or cross talk condition may be present.

SUMMARY OF THE INVENTION

An electrophoretic cell generally has a top electrode layer which may have at least one row electrode and a bottom electrode layer which may have at least one column electrode. If there are no gating electrodes present, the electric field generated by the row and column electrodes would control the up/down movement of the charged particles. The present invention is directed to an improved design, which has at least one in-plane gating electrode. The gating electrodes may be on the top electrode layer, on the bottom electrode layer or on both layers.

It should be appreciated that the present invention can be implemented in numerous ways. Several inventive embodiments of the present invention are described below.

In one embodiment, the electrophoretic display comprises electrophoretic cells filled with charged particles dispersed in a dielectric solvent. Each cell is positioned between a top electrode layer and a bottom electrode layer. The top electrode layer comprises at least one driving electrode positioned over more than one cell. The bottom electrode layer comprises at least one driving electrode positioned under more than one cell. The display further comprises at least one in-plane gating electrode, located in either the top layer or the bottom layer.

The gating electrode(s) provide a gating effect, which raises the effective threshold voltage to prevent the undesired movement of the charged particles in the cells. In addition, the design of the present invention can be manufactured using low cost materials by efficient processes.

These and other features and advantages of the present invention will be presented in more detail in the following detailed description and the accompanying figures, which illustrate by way of example the principles of the invention.

DETAILED DESCRIPTION OF THE INVENTION

I. Cross Bias and the Resulting Relationship Between Driving Voltage and Threshold Voltage The term "threshold voltage" (Vth), in the context of the present disclosure, is defined as the maximum bias voltage that does not cause the particles in a cell to move between electrodes. The term "driving voltage" (Vd), in the context of the present disclosure, is defined as the bias voltage applied to change the color state of a cell, such as by driving the particles in the cell from an initial position at or near one electrode to an end position at or near the opposite electrode. The driving voltage Vd used in a particular application must be sufficient to cause the color state of the cell to change within the required performance parameters of the application, including as measured by such parameters as the time it takes for the state transition to be completed.

A "scanning" row in a passive matrix display is a row in the display that is currently being updated or refreshed. A "non-scanning" row is a row that is not currently being updated or refreshed. A "positive bias", in the context of the present disclosure, is defined as a bias that tends to cause positively charged particles to migrate downwards (i.e., upper electrode at higher potential than lower electrode). A "negative bias", in the context of the present disclosure, is defined as a bias that tends to cause positively charged particles to migrate upwards (i.e., lower electrode at higher potential than upper electrode).

Figure 4A:
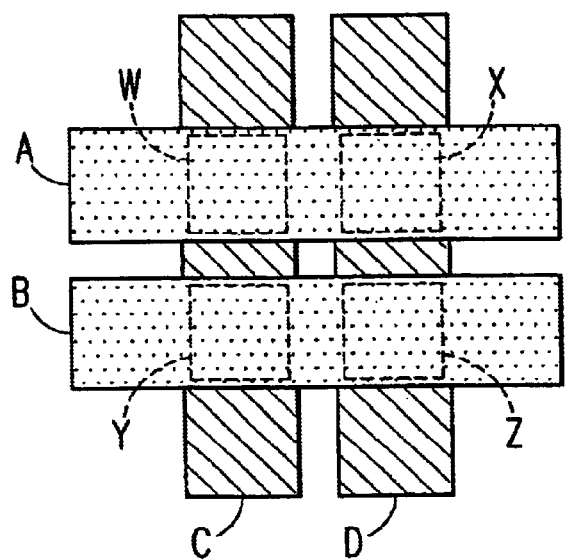
FIGS. 4A and 4B illustrate the relationship between threshold voltage and driving voltage for a 2×2 passive matrix.
Figures 1, 4B:
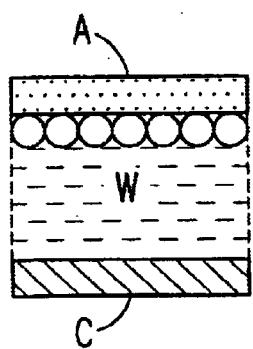
Figures 2, 4B:
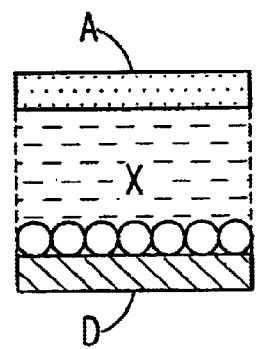
Figures 3, 4B:
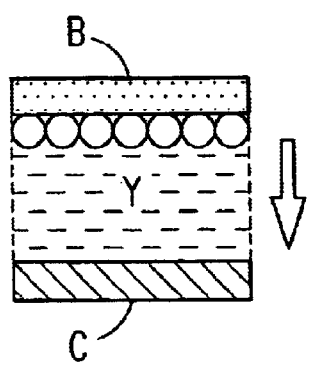
Figures 4, 4B:
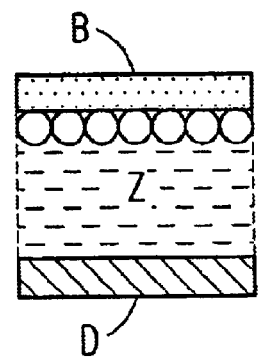

For a typical passive-matrix, the row electrodes are on the top, and the column electrodes are on the bottom and perpendicular to the row electrodes. FIGS. 4A and 4B illustrate a 2×2 passive matrix. FIG. 4A shows the top view of a general 2×2 passive matrix. In this figure, voltage A drives the top, non-scanning row and voltage B drives the bottom, scanning row.

Initially, as shown in FIG. 4B, the particles in cells W, Y and Z are at the top of the cells, and the particles in cell X are at the bottom of the cell. Assume the scanning row B is to be modified such that the particles in cell Y are moved to the bottom electrode while the particles in cell Z are to be maintained at their current position at the top electrode. The particles in the cells of the non-scanning row should, of course, remain at their initial positions—W at the top electrode and X at the bottom electrode—even if a cross-biasing condition is present.

Because Cells W and X are in a non-scanning row, the goal is to ensure that the particles remain at the current electrode position even when there is a cross bias condition affecting the row. The threshold voltage of the cell is an important factor in these two cases. Unless the threshold voltage is equal to or greater than the cross bias voltage that may be present, the particles in these cells will move when such a cross bias is present, thereby reducing the contrast ratio.

In order to drive the particles in cell Y from the top electrode to the bottom electrode within a specific time period, a driving voltage Vd must be applied. The driving voltage used in a particular application may be determined by a number of factors, including but not necessarily limited to cell geometry, cell design, array design and layout, and the materials and solvents used. In order to move the particles in cell Y without affecting the particles in cells W, X and Z, the driving voltage Vd applied to change the state of cell Y must also be of a magnitude, and applied in such a way, so as not to result in the remaining cells being cross biased in an amount greater than the threshold voltage Vth of the cells.

To determine the minimum threshold voltage needed to avoid unintended state changes in the basic passive matrix illustrated in FIGS. 4A and 4B under these conditions, the following inequality conditions must be satisfied:

$$A-C \leq Vth$$
$$D-A \leq Vth$$
$$B-C \geq Vd$$
$$B-D \leq Vth$$

This system of equations may be solved by summing the three inequalities involving Vth, to yield the inequality $(A-C)+(D-A)+(B-D) \leq Vth+Vth+Vth$, which simplifies to $B-C \leq 3Vth$ or $3Vth \geq B-C$. Combining this inequality with the remaining inequality $B-C \geq Vd$, we conclude that $3Vth \geq B-C \geq Vd$, which yields $3Vth \geq Vd$ or $Vth \geq \frac{1}{3} Vd$. That is, for the passive matrix illustrated in FIGS. 4A and 4B, the cells must have a threshold voltage equal to or greater than one third of the driving voltage to be applied to change the state of those cells in which a state change is desired in order to avoid changing as a result of cross bias the state of those cells in which a state change is not desired. In the example illustrated in FIGS. 4A and 4B, assuming B=Vd, then A=⅓Vd, C=0 and D=⅔Vd. For example, in one embodiment the driving voltage required to achieve acceptable performance is 30V. If the driving voltage Vd=30V in the passive matrix display illustrated in FIGS. 4A and 4B, then the minimum threshold voltage that would be required to retain the initial state of cells W, X, and Z while changing the state of cell Y by applying a driving voltage of 30V to cell Y would be Vth=10V. Assuming B=30V, the solution to the above equations is A=10V, C=0V and D=20V. By reference to FIGS. 4A and 4B, one can see that under these conditions the bias applied to each of cells W, X, and Z would in fact be less than or equal to the minimum threshold voltage Vth=10V. For proper operation and performance, therefore, the cell threshold voltage must be quite high relative to the driving voltage to be applied to change the electrophoretic display cell state to avoid unwanted state changes or display performance degradation due to cross bias.

However, as described above, EPDs made using currently available and commercially feasible material, techniques and designs typically do not have such a high threshold voltage.

II. Various In-Plane Gating Electrode Structures

An electrophoretic display with at least one in-plane gating electrode is disclosed. The term "in-plane gating electrode" as used in this disclosure is defined as a gating electrode located in substantially the same plane or layer as the electrode for which it performs a gating function by effectively increasing the voltage difference (bias) that must be applied between the electrode for which the gating electrode performs the gating function and the opposite electrode to pull particles away from the electrode for which the gating function is performed. For example, in an electrophoretic display having a top electrode layer and a bottom electrode layer, one or more in-plane gating electrodes may be located in the top layer, or in the bottom layer, or both. The term "in-plane gating electrode" thus distinguishes a gating electrode formed in substantially the same layer as the electrode with which it is associated from a gating electrode formed in a separate layer, such as those described in the above-referenced patents assigned to Copytele, Inc.

Figure 1:
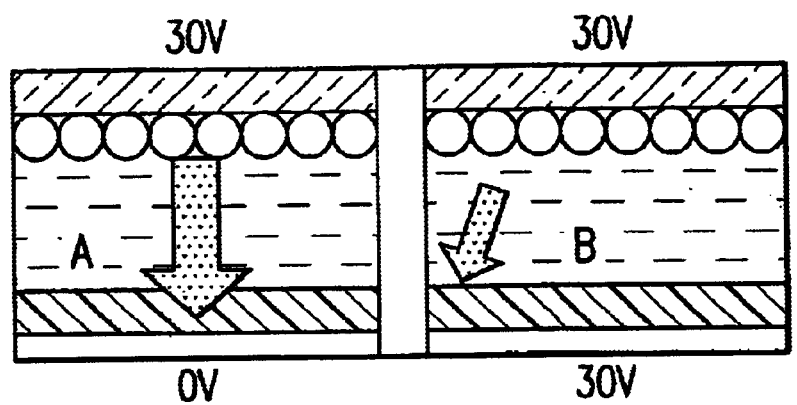
FIG. 1 illustrates the "cross talk" phenomenon of an EPD.
Figure 2A:
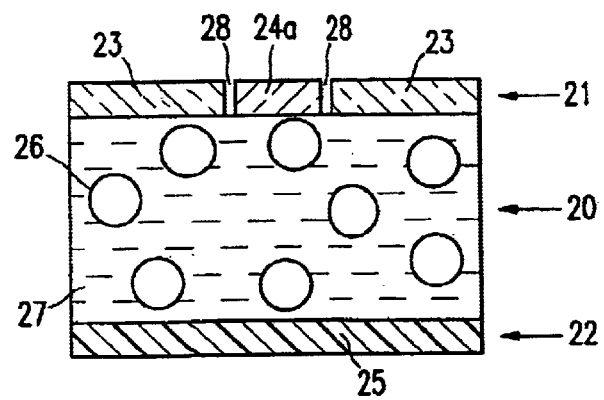
FIGS. 2A–2D are schematic depictions of electrophoretic displays with in-plane gating electrodes.

In one embodiment, as shown in FIG. 2A, the display comprises one top electrode layer (21) and one bottom electrode layer (22), at least one of which is transparent (21) and a cell (20) positioned between the two layers. The top electrode layer (21) comprises a series of row electrodes and bottom electrode layer (22) comprises a series of column electrodes oriented perpendicular to the top row electrodes. The top electrode layer (21) has two row electrodes (23) and one in-plane gating electrode (24a) placed in between the two row electrodes. The in-plane gating electrode (24a) is spaced from each of the row electrodes (23) by a gap (28). The bottom electrode layer (22) has one column electrode (25) and no gating electrodes. In one embodiment, the in-plane gating electrode (24a) is formed in the same fabrication module as the row electrodes (23) by first depositing a layer of electrode material and then etching away part of the material in accordance with a pattern to define the row and gating electrodes in the same layer. Alternatively, the one in-plane gating electrode may be placed in the bottom electrode layer between two column electrodes (not shown), with no gating electrodes being located in the top electrode layer.

Figure 2B:
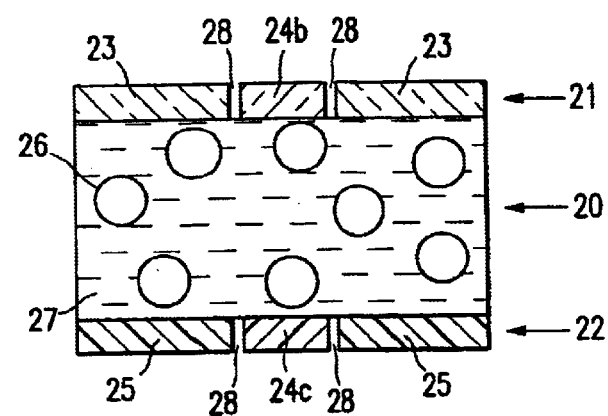

FIG. 2B shows an electrophoretic display used in one embodiment that has two in-plane gating electrodes (24b and 24c), one of which (24b) is located in the top electrode layer between two row electrodes (23) and the other (24c) in the bottom electrode layer between two column electrodes (25). The in-plane gating electrode (24b) is spaced from each of the row electrodes (23) by a gap (28) and the in-plane gating electrode (24c) is spaced from each of the column electrodes (25) by a gap (28).

Figure 2C:
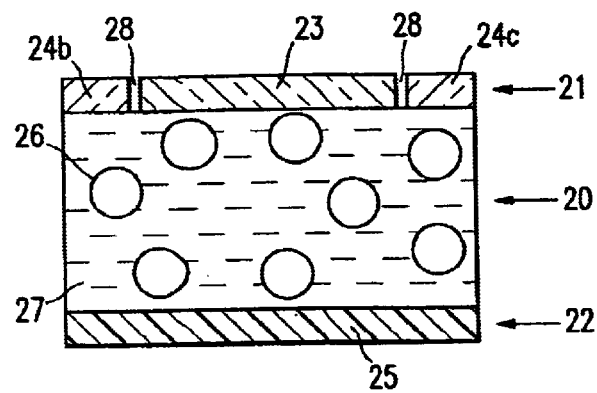

FIG. 2C shows an alternative design in which both gating electrodes (24b and 24c) are in the same top electrode layer placed on each side of a row electrode (23). Each of the in-plane gating electrodes (24b and 24c) is spaced from the row electrode (23) by a gap (28). Alternatively, the two gating electrodes may be placed in the same bottom electrode layer on each side of a column electrode (not shown).

Figure 2D:
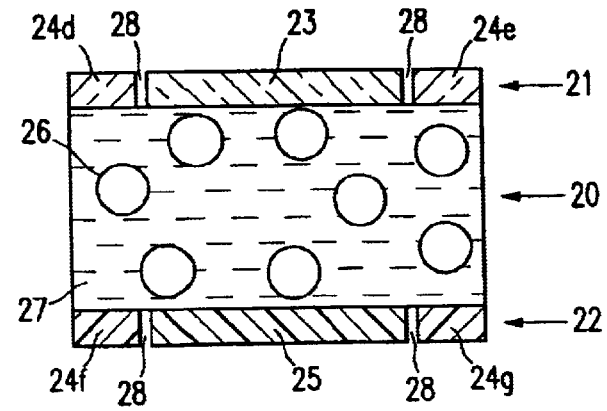

FIG. 2D illustrates a design having four gating electrodes (24d, 24e, 24f and 24g), two (24d and 24e) on the top electrode layer and the other two (24f and 24g) on the bottom electrode layer. The gating electrodes are placed at each side of row (23) and column (25) electrodes. Each of the in-plane gating electrodes (24d and 24e) is spaced from the row electrode (23) by a gap (28), and each of the in-plane gating electrodes (24f and 24g) is spaced from the column electrode (25) by a gap (28).

The cells in FIGS. 2A–2D are filled with charged pigment particles (26) dispersed in a colored dielectric solvent (27).

In one embodiment, the gaps (28) of the embodiments shown in FIGS. 2A–2D are filled with material deposited in a processing step subsequent to the formation of the gating electrodes. In one embodiment, the gaps (28) are approximately 15 microns wide. In one embodiment, the gap size is less than 15 microns.

FIGS. 2A–2D only illustrate a few representative designs. It is understood that in order to meet the specific requirements of an EPD, the number of in-plane gating electrodes, as well as their precise placement and dimensions, may vary and all such variations are within the scope of the present invention.

Figure 3:
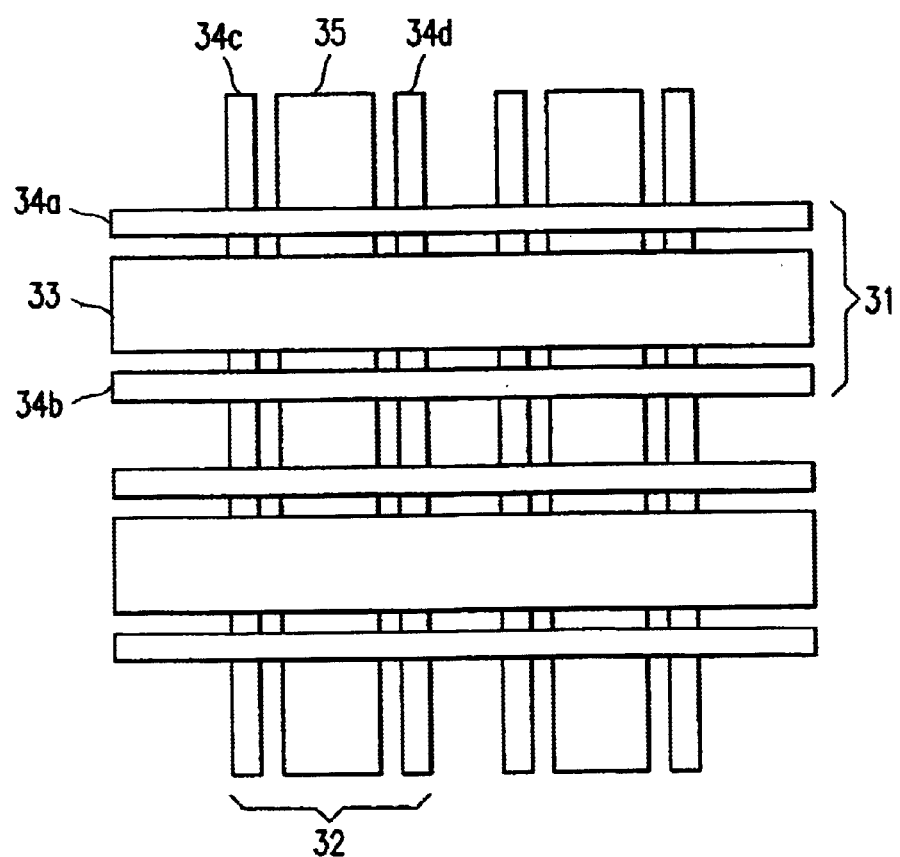
FIG. 3 is a top view of an electrophoretic display with in-plane gating electrodes on both the top and bottom layers.

To illustrate further how structures such as those shown in FIGS. 2A–2D may be implemented in an EPD, FIG. 3 is a top view of an electrophoretic display in which there are four in-plane gating electrodes, such as in the embodiment shown in FIG. 2D. Two of the gating electrodes (34a and 34b) are in the top electrode layer (31), one on each side of a row electrode (33). The other two (34c and 34d) are in the bottom electrode layer (32), one on each side of a column electrode (35). The top and bottom electrode layers are perpendicular to each other with each intersection of a row and column electrode comprising a cell location.

III. Operation of a Passive Driving Matrix with In-Plane Gating Electrodes

When the in-plane gating electrode(s) is/are in the top electrode layer, such as the structure shown in FIG. 2A or the structure shown in FIG. 2C, a high voltage may be applied to the top row electrode, a low voltage may be applied to the bottom column electrode and the top gating electrode(s) may be set at a voltage higher than the voltage of the row electrode. Under these conditions, the positively charged particles at the top of a cell are prevented from moving downwards.

Figure 5:
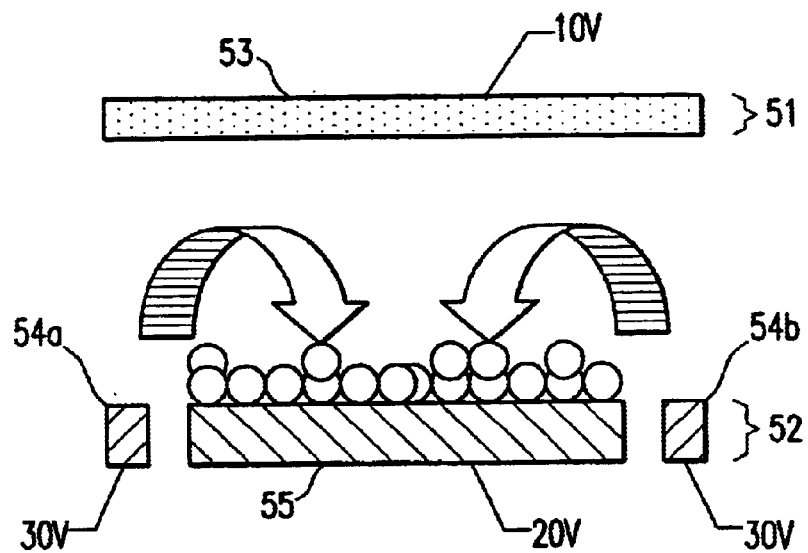
FIG. 5 illustrates the passive matrix driving system with two gating electrodes on the bottom electrode layer.

In another scenario, the gating electrode(s) is/are in the bottom electrode layer. When the top row electrode is set at a low voltage, the bottom column electrode is set at a high voltage and the bottom gating electrode(s) is/are is set a voltage higher than the voltage of the column electrode, the positively charged particles at the bottom of the cell are prevented from moving upwards. FIG. 5 illustrates this scenario in which a cell (not shown) is positioned between a top electrode layer (51) and a bottom electrode layer (52). At the cell location (i.e., the point of intersection of the top row and bottom column electrodes), the top layer has one row electrode (53) and the bottom layer has one column electrode (55) and two gating electrodes (54a and 54b) one on each side of the column electrode (55). Assume the cell is in a non-scanning row, such that the initial state of the cell (positively charged particles on top) is to be retained. Assume further the following bias conditions: the row electrode is set at 10V, the column electrode is set at 20 V and each of the gating electrodes are set at 30V. The voltages applied to the row and column electrode in this example may be due to a cross bias resulting from the voltages applied to other cells in the scanning row, to change or retain their state, as described above in connection with cell X, for example, of FIGS. 4A and 4B. Since the cell of FIG. 5 is negatively biased (bottom electrode at higher potential than top electrode) by 10V under the conditions assumed above, a threshold voltage of at least 10V is required to prevent movement of the particles from the bottom of the cell.

As noted above, in the absence of a gating electrode such a high threshold voltage cannot be achieved using currently available materials and techniques without an undesirable degradation in display performance. In the display illustrated in FIG. 5, however, under the biasing conditions described above the presence of the two gating electrodes results in the particles being prevented from moving upwards away from the bottom electrode. The gating effect generated by the gating electrodes also counters the cross talk effect by tending to reduce or cancel any force generated by the biasing conditions at adjacent cells that may otherwise have tended to pull the charged particles to the opposite electrode. The gating effect generated by the gating electrodes thus effectively increases the threshold voltage to the level required for passive matrix driving of the EPD without degradation of display performance due to cross bias or cross talk.

Figure 6:
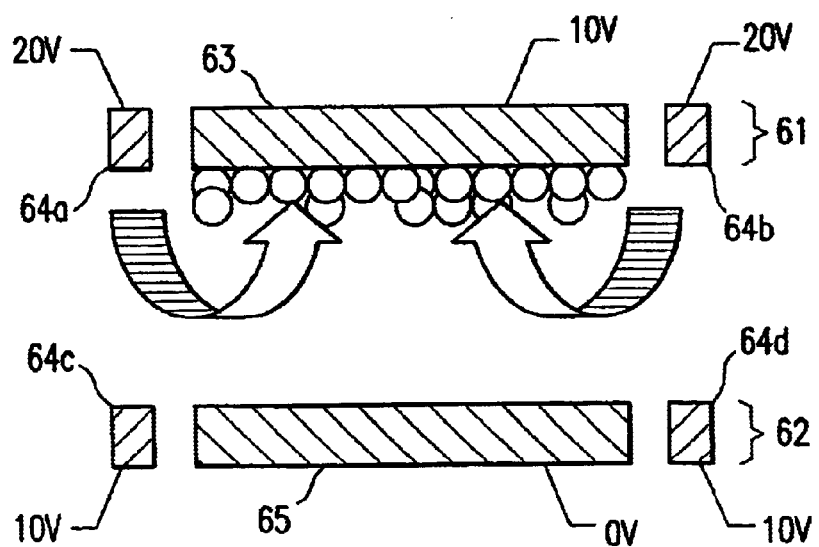
FIG. 6 illustrates the passive matrix driving system with four gating electrodes, two on the top electrode layer and two on the bottom electrode layer of a cell.

In the embodiment shown in FIG. 6, there are four gating electrodes (64a, 64b, 64c and 64d), two of which are in the top electrode layer (61) one on each side of a row electrode (63) and the other two are in the bottom electrode layer (62), one on each side of a column electrode (65). Assume the following conditions: a voltage of 10V is applied to the top row electrode (63); 0V is applied to the bottom column electrode (65); 20V is applied to each of the top gating electrodes (64a and 64b); and 10V is applied to each of the bottom gating electrodes (64c and 64d). The cell is positively biased (top electrode at higher potential than bottom electrode) by 10V. The gating effect generated by the two top gating electrodes tends to prevent the particles from moving downwards. Under the bias conditions shown, the bottom gating electrodes contribute to the gating effect generated by the top gating electrodes. The presence of gating electrodes in both the top and bottom electrode layers provides the ability to generate a holding force to hold the charged particles either in the top position or in the bottom position, with the voltages applied to each electrode being adjusted as necessary to maintain the desired state. For example, to hold the particles at the bottom column electrode when a voltage of 10V is applied to the bottom electrode and 0 V is applied to the top electrode, a voltage of 20V may be applied to the bottom gating electrodes and a voltage of 10V applied to the top gating electrodes (i.e., the opposite of the conditions shown in FIG. 6). This design therefore provides a gating effect for both driving directions and effectively increases the threshold voltage in both directions.

Because, as described above, the in-plane gating electrodes may be formed in the same processing step or module as the electrode for which they are to perform the gating function, the design described herein is superior to the approach in which gating electrodes are formed in separate layers because such structures are less reliable, require additional processing steps and include more complex and fragile structures, which results in lower yield (i.e., fewer satisfactory units as a percentage of units fabricated).

While certain of the embodiments described above employ positively charged particles, the methods and structures described herein may be applied as well to electrophoretic displays in which negatively charged particles are used. In an embodiment in which cells having negatively charged particles are used, those of ordinary skill in the art will recognize that biasing voltages of opposite polarity must be employed. For example, in one embodiment a structure such as shown in FIG. 5 is used and a gating effect is generated to maintain negatively charged particles at the lower electrode by applying a first voltage to the upper electrode (53), applying to the lower electrode (55) a second voltage that is lower than the first voltage, and applying to each of the gating electrodes (54a and 54b) a third voltage that is lower than the second voltage. For example, a voltage of −10V may be applied to the upper electrode (53), a voltage of −20V to the lower electrode (55), and a voltage of −30V to each of the gating electrodes (54a and 54b). Alternatively, a voltage of +20V may be applied to the upper electrode (53), a voltage of +10V to the lower electrode (55), and a voltage of 0V to each of the gating electrodes (54a and 54b).

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

It is therefore desired that this invention be defined by the scope of the appended claims as broadly as the prior art will permit, and in view of the specification.

What is claimed is:

1. An electrophoretic display comprising
    (a) electrophoretic cells filled with charged particles dispersed in a dielectric solvent; each said cell being positioned between a top electrode layer and a bottom electrode layer, said top electrode layer comprising at least one driving electrode positioned over more than one cell and said bottom electrode layer comprising at least one driving electrode positioned under more than one cell; and
    (b) at least one in-plane gating electrode.

2. The electrophoretic display of claim 1 wherein said at least one in-plane gating electrode is/are placed in said top electrode layer.

3. The electrophoretic display of claim 1 wherein said at least one in-plane gating electrode is/are placed in said bottom electrode layer.

4. The electrophoretic display of claim 1 wherein said at least one in-plane gating electrode is associated with at least one driving electrode in either the top or the bottom electrode layer.

5. The electrophoretic display of claim 4 wherein there is a gap between the at least one in-plane gating electrode and the at least one driving electrode with which it is associated.

6. The electrophoretic display of claim 1 comprising at least two in-plane gating electrodes wherein at least one of said at least two in-plane gating electrodes is/are placed in the top electrode layer and at least one of said at least two in-plane gating electrodes is/are placed in the bottom electrode layer.

7. The electrophoretic display of claim 1 wherein the upper electrode layer comprises at least two driving electrodes associated with at least one cell in common and one of said in-plane gating electrodes is placed in the upper electrode layer between two of said at least two driving electrodes associated with at least one cell in common.

8. The electrophoretic display of claim 1 wherein the bottom electrode layer comprises at least two driving electrodes associated with at least one cell in common and one of said in-plane gating electrodes is placed in the bottom electrode layer between two of said at least two driving electrodes associated with at least one cell in common.

9. The electrophoretic display of claim 1 comprising at least two in-plane gating electrodes.

10. The electrophoretic display of claim 9 wherein two of said at least two in-plane gating electrodes are placed on each side of a driving electrode in the top electrode layer.

11. The electrophoretic display of claim 9 wherein two of said at least two in-plane gating electrodes are placed on each side of a driving electrode in the bottom electrode layer.

12. The electrophoretic display of claim 9 wherein one of said at least two gating in-plane electrodes is placed in the upper electrode layer between two driving electrodes of the upper electrode layer, said two driving electrodes of the upper electrode layer being associated with at least one cell in common, and the other is placed in the bottom electrode layer between two driving electrodes of the bottom electrode layer, said two driving electrodes of the bottom electrode layer being associated with at least one cell in common.

13. The electrophoretic display of claim 1 comprising at least four in-plane gating electrodes.

14. The electrophoretic display of claim 13 wherein two of said at least four in-plane gating electrodes are placed in the upper electrode layer on each side of a driving electrode of the upper electrode layer and the other two are placed in the bottom electrode layer on each side of a driving electrode of the bottom electrode layer.

15. The electrophoretic display of claim 1 wherein each of said in-plane gating electrodes is associated with at least one driving electrode of the top electrode layer or at least one driving electrode of the bottom electrode layer, and each of said in-plane gating electrodes is configured to generate a gating effect that tends to prevent said charged particles in at least one of said electrophoretic cells from moving from the at least one driving electrode with which the gating electrode is associated to an opposite driving electrode on the side of the at least one of said electrophoretic cells opposite the at least one driving electrode with which the gating electrode is associated.

16. The electrophoretic display of claim 15 wherein said gating effect is generated by applying voltages to the in-plane gating electrode, the at least one driving electrode with which the gating electrode is associated, and the opposite driving electrode.

17. The electrophoretic display of claim 16 wherein said charged particles are positively charged and wherein said gating effect is generated when said opposite driving electrode is set at a first voltage, said at least one driving electrode with which the gating electrode is associated is set at a second voltage that is higher than the first voltage, and said gating electrode is set a third voltage that is higher than the second voltage.

18. The electrophoretic display of claim 16 wherein said charged particles are negatively charged and wherein said gating effect is generated when said opposite driving electrode is set at a first voltage, said at least one driving electrode with which the gating electrode is associated is set at a second voltage that is lower than the first voltage, and said gating electrode is set at a third voltage that is lower than the second voltage.

19. The electrophoretic display of claim 1 wherein said top electrode layer comprises one or more row electrodes.

20. The electrophoretic display of claim 1 wherein said bottom electrode layer comprises one or more column electrodes.

21. The electrophoretic display of claim 1 wherein said top electrode layer comprises one or more row electrodes, said bottom electrode layer comprises one or more column electrodes, and each of said electrophoretic cells is located at an intersection of at least one row electrode and at least one column electrode.

22. The electrophoretic display of claim 1 wherein said electrophoretic cells are prepared from microcups.

23. The electrophoretic display of claim 1 wherein said electrophoretic cells are prepared from microchannels.

24. The electrophoretic display of claim 1 wherein said electrophoretic cells are prepared from microcapsules.

* * * * *